(12) United States Patent
Iwashita et al.

(10) Patent No.: US 7,729,845 B2
(45) Date of Patent: Jun. 1, 2010

(54) FUEL INJECTION CONTROL DEVICE

(75) Inventors: Takuro Iwashita, Fujisawa (JP);
Takashi Haseyama, Fujisawa (JP);
Yoshinobu Watanabe, Fujisawa (JP);
Naofumi Ochi, Fujisawa (JP); Kenji Hagio, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 283 days.

(21) Appl. No.: 11/995,665

(22) PCT Filed: Jun. 22, 2006

(86) PCT No.: PCT/JP2006/312511

§ 371 (c)(1),
(2), (4) Date: Jan. 14, 2008

(87) PCT Pub. No.: WO2007/010707

PCT Pub. Date: Jan. 25, 2007

(65) Prior Publication Data

US 2009/0150045 A1 Jun. 11, 2009

(30) Foreign Application Priority Data

Jul. 15, 2005 (JP) ................................ 2005-206757

(51) Int. Cl.
*G06F 19/00* (2006.01)
*F02M 51/00* (2006.01)

(52) U.S. Cl. ....................... 701/104; 701/105; 123/299; 123/480

(58) Field of Classification Search ......... 701/101–105, 701/110, 113, 115; 123/295, 299, 300, 304, 123/305, 431, 478, 480, 486, 492, 493; 60/285
See application file for complete search history.

(56) References Cited

U.S. PATENT DOCUMENTS

| 5,988,144 | A  | * | 11/1999 | Yoshioka et al. | ............ 701/104 |
| 6,729,297 | B2 | * | 5/2004  | Futonagane et al. | ......... 123/299 |
| 6,755,176 | B2 |   | 6/2004  | Takeuchi et al. | |
| 6,988,485 | B2 | * | 1/2006  | Ichise et al. | ................. 123/431 |
| 7,073,493 | B2 | * | 7/2006  | Nakasaka et al. | ........... 701/103 |
| 7,159,547 | B2 | * | 1/2007  | Nakasaka et al. | ........... 701/103 |
| 7,165,533 | B2 | * | 1/2007  | Adachi et al. | ............... 123/299 |
| 7,398,772 | B2 | * | 7/2008  | Nakasaka et al. | ........... 123/345 |

FOREIGN PATENT DOCUMENTS

| JP | 5-1606       |   | 8/1993  |
| JP | 07293307 A   | * | 11/1995 |
| JP | 11141372 A   | * | 5/1999  |
| JP | 2003-254139  |   | 9/2003  |

* cited by examiner

*Primary Examiner*—Willis R Wolfe, Jr.
(74) *Attorney, Agent, or Firm*—McCormick, Paulding & Huber LLP (57) ABSTRACT

A fuel injection control device that prevents a misfire is provided. The fuel injection control device comprises: target injection amount determination means 3 for determining a target injection amount of each fuel injection, so that the amount of fuel to be supplied to a cylinder in one combustion cycle is supplied in a plurality of fuel injections; and fuel injection correction amount determination means 4 for determining a fuel correction amount of one combustion cycle, wherein the fuel injection correction amount determination means 4 distributes the correction amount among each fuel injection in accordance with the ratio of a target injection amount of each fuel injection in the cylinder.

3 Claims, 4 Drawing Sheets

FUEL INJECTION CONTROL DEVICE

CROSS REFERENCE TO RELATED APPLICATIONS

This application is entitled to the benefit of and incorporates by reference essential subject matter disclosed in International Patent Application No. PCT/JP2006/312511 filed on Jun. 22, 2006 and Japanese Patent Application No. 2005-206757 filed on Jul. 15, 2005.

TECHNICAL FIELD

The present invention relates to a fuel injection control device for carrying out multiple injection in a plurality of cylinders, and to a fuel injection control device for preventing misfire.

BACKGROUND ART

When fuel injection is carried out by an injector, a computer (ECU) determines the amount of fuel to be supplied in one combustion cycle on the basis of factors such as amount of an accelerator pedal stroke, engine speed and the like.

In the case of an engine having a plurality of cylinders, an injector is arranged in each cylinder, so that a respective injector injects fuel into the corresponding cylinder. Therefore, individual variability in the injectors is reflected as differences in performance among the cylinders. Specifically, even when an injection amount instructed from a computer to the injector is constant, the injection amount actually injected by the injector shows variations, albeit small variations, among individual injectors, which results in output energy differences among cylinders.

On the other hand, in order to suppress engine vibration, the angular velocity of the crankshaft is preferably constant, irrespective of the rotation angle. To that end, the output energy difference among cylinders needs to be cancelled, and hence it is necessary to equalize the amount of fuel actually injected into each cylinder. The instructed injection amount is thus adjusted among cylinders. This is called inter-cylinder adjustment. Specifically, the injection amount is reduced for a cylinder having a faster angular velocity than other cylinders, and is increased for a cylinder having a slower angular velocity than other cylinders, to correct thereby the injection amount in one combustion cycle for each cylinder, in such a way that the angular velocities of the cylinders become identical.

That is, $$QFINR = QFIN + Acyl$$

holds for a given cylinder, wherein QFIN denotes an injection amount before correction, Acyl denotes an inter-cylinder correction amount, and QFINR denotes an injection amount after correction, in one combustion cycle.

Among individual engines, owing to variations in the performance of the engine itself and/or to injector variation, engine output varies even for an identical injection amount instructed by an ECU. The correction for equalizing engine output is the output correction (Q adjustment correction). Specifically, that correction involves adjusting the injection amount in such a way that that full load output becomes constant. Full load designates the portion having the largest output in each engine speed, and full load output denotes the output at that time.

Herein, $$QFINR = QFIN + Apow$$

holds for a given cylinder, wherein QFIN denotes an injection amount before correction in one combustion cycle, Apow denotes an inter-cylinder correction amount, and QFINR denotes an injection amount after correction.

Also, fuel volume varies with temperature. That is, when volume increases due to thermal expansion, a desired mass of fuel fails to be injected even if the injector injects a certain volume of fuel. Therefore, a correction is carried out in which the fuel injection amount at volume is adjusted in such a way that the fuel injection amount at mass does not vary due to fuel temperature.

When all these different corrections are carried out, the total correction amount is the sum of the respective correction amounts.

DISCLOSURE OF THE INVENTION

In fuel injection control devices for controlling fuel injection by an injector, multiple injection (multi-injection) control, in which the amount of fuel to be supplied in one combustion cycle is divided into a plurality of fuel injections, is known. In multiple injection control, a fuel injection that carries out 4 fuel injections is known, wherein the injections, called pilot injection, pre-injection, main injection, and after-injection, follow an injection execution sequence; in recent years, post-injection is being carried out after after-injection, for forced regeneration through a raise in exhaust temperature, with the objective of preventing filter clogging.

Upon determining, in multiple injection control, the amount of fuel to be supplied to a cylinder among a plurality of cylinders in one combustion cycle, that fuel amount is supplied over a plurality of fuel injections, and hence an ECU is required to determine a target injection amount for each injection for each cylinder.

Figure 5:
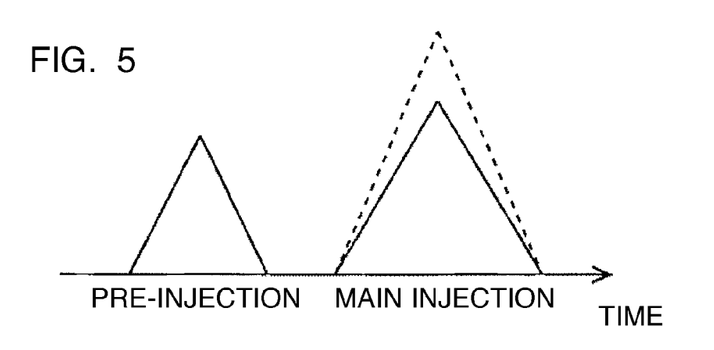
FIG. 5 is a fuel injection image diagram of a conventional fuel injection control device.

In such a fuel injection control device, a conventional method utilizing the various above-described corrections involve adding a correction amount of one combustion cycle to the target injection amount of a main injection. For instance, in a fuel injection control device where two-stage injection comprising pre-injection and main injection is carried out, the injection amount determined by correction becomes:

$$P\text{pre} + P\text{main} + A = P\text{pre} + P'\text{main}$$

wherein Ppre denotes a target pre-injection amount, Pmain denotes a target main injection amount, A denotes a correction amount in one combustion cycle, and P'main denotes a main injection amount after correction. FIG. 5 illustrates an image of such correction. Specifically, the horizontal axis denotes a time axis, such that the triangles on the time axis denote each injection, the time position of the triangles denotes injection timing, the height (or area) of the triangles denotes injection amount, the broken line (when overlapping with a solid line, the solid line takes precedence) denotes a target injection amount, and the solid line denotes injection amount after correction (the same applies to all the figures). The figure shows that, for pre-injection, no change is made in the injection amount before and after the correction, and only for main injection, the injection amount changes through correction.

Figure 6:
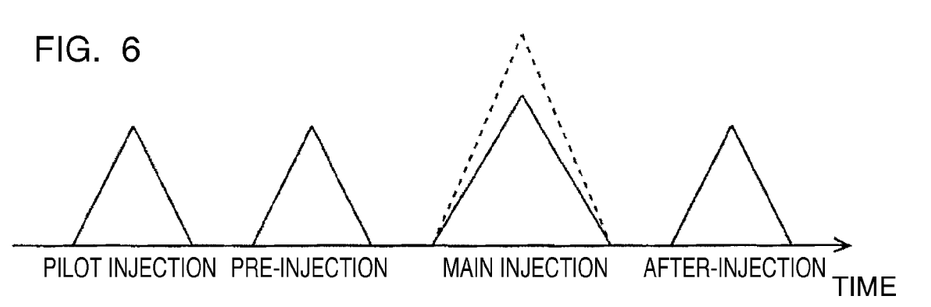
FIG. 6 is a fuel injection image diagram of a conventional fuel injection control device.

In an example which carries out 4 fuel injections, correction is also carried out only for main injection. That is, the injection amount as determined by correction is $$P\text{pil}+P\text{pre}+P\text{main}+P\text{aft}+A=P\text{pil}+P\text{pre}+P'\text{main}+P\text{aft}$$

wherein Ppil is a pilot injection target injection amount, Ppre is a target pre-injection amount, Pmain is a target main injection amount, Paft is a target after-injection amount, A is a correction amount in one combustion cycle, and P'main is a main injection amount after correction. FIG. 6 illustrates an image of correction similar to that of FIG. 5. The figure shows that, for pilot injection, pre-injection and after-injection, no change is made in the injection amount before and after the correction, and that the injection amount changes through correction only for main injection.

Figure 7:
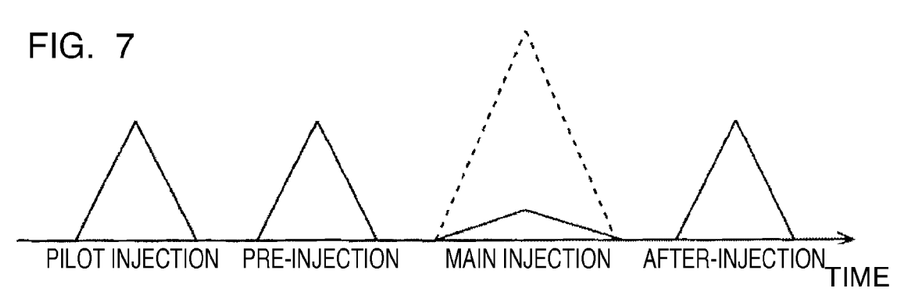
FIG. 7 is a fuel injection image diagram of a conventional fuel injection control device.

However, problems such as impaired drivability and/or defective temperature increase brought about by changes in combustion characteristics and/or by misfires may occur when the main injection amount after correction P'main becomes zero, or very small, on account of the magnitude of the relationship between the correction amount A in one combustion cycle and the target main injection amount Pmain. For instance, when correction such as the one illustrated in FIG. 7 is carried out, the injection amount in main injection becomes extremely small.

When the injection amount becomes extremely small in an injector, there are instances where injection actually fails to take place. The number of fuel injections is thereby reduced. In multiple injection, however, where the number of fuel injections is an important factor, changes in the number of injections are undesirable.

In multiple injection, the fuel injections that precede the main injection are important, and hence misfire can occur if no fuel is injected in a fuel injection that precedes main injection.

Therefore, an object of the present invention is to solve the above problems and to provide a fuel injection control device that prevents misfires.

In order to attain the above goal, the present invention is a fuel injection control device, comprising: target injection amount determination means for determining a target injection amount of each fuel injection for an injector arranged on a respective cylinder of an engine having a plurality of cylinders, for injecting fuel into the cylinder, so that the amount of fuel to be supplied to the cylinder in one combustion cycle is supplied in a plurality of fuel injections; and fuel injection correction amount determination means for determining a fuel correction amount of one combustion cycle for the amount of fuel to be supplied to the cylinder in one combustion cycle; wherein the fuel injection correction amount determination means distributes the correction amount among each fuel injection in accordance with the ratio of a target injection amount of each fuel injection in the cylinder.

The fuel injection correction amount determination means may determine a correction amount that is distributed sequentially from a fuel injection, among a plurality of fuel injections, that is first in an execution order, so that when, on the basis of the determination, an injection amount (target injection amount+correction amount) of the fuel injection falls below a pre-set lowest reference value for each injection, the correction amount may be re-determined such that the injection amount becomes equal to or greater than the lowest reference value, and the correction amount increment in the fuel injection, resulting from that re-determination, may be deducted from a correction amount in subsequent fuel injections.

The fuel injection correction amount determination means may determine an injection amount by adding a correction amount to a target injection amount, sequentially from a fuel injection, among a plurality of fuel injections, that is last in an execution order, so that when, on the basis of the determination, the injection amount of the fuel injection falls below a pre-set lowest injection amount, the injection amount may be re-determined such that the injection amount becomes equal to or greater than the lowest injection amount, and the correction amount increment in the fuel injection, resulting from that re-determination, may be deducted from the injection amount of a preceding fuel injection.

The present invention affords the following effect: changes in the number of injections are suppressed in multiple injection, through injection amount correction, thereby reducing the likelihood of misfires.

BEST MODE FOR CARRYING OUT THE INVENTION

An embodiment of the present invention is explained next with reference to accompanying drawings.

The basic principle of the present invention will be explained on the basis of an example in which fuel injection is carried out divided into four fuel injections, i.e. pilot injection, pre-injection, main injection, and after-injection, such that the amount of fuel to be injected to a concerned cylinder in one combustion cycle and the correction amount in one combustion cycle are summed:

$$P\text{pil}+P\text{pre}+P\text{main}+P\text{aft}+A=P'\text{pil}+P'\text{pre}+P'\text{main}+P'\text{aft} \quad (1)$$

wherein Ppil is a target pilot injection amount, Ppre is a target pre-injection amount, Pmain is a target main injection amount, Paft is a target after-injection amount, A is a correction amount in one combustion cycle, P'pil is a pilot injection amount after correction, P'pre is a pre-injection amount after correction, P'main is a main injection amount after correction, and P'aft is an after-injection amount after correction. The correction amount is thus distributed among each fuel injection.

Herein, the correction amounts Apil, Apre, Amain, Aaft in each fuel injection satisfy the relationship $$A=A\text{pil}+A\text{pre}+A\text{main}+A\text{aft} \quad (2)$$

The amount of fuel to be supplied in one combustion cycle $\Sigma P$ is $$\Sigma P=P\text{pil}+P\text{pre}+P\text{main}+P\text{aft} \quad (3)$$

and hence, the amounts of each injection as determined by correction are $$P'\text{pil} = (A \times P\text{pil}/\Sigma P) + P\text{pil} \quad (4)$$

$$P'\text{pre} = (A \times P\text{pre}/\Sigma P) + P\text{pre} \quad (5)$$

$$P'\text{main} = (A \times P\text{main}/\Sigma P) + P\text{main} \quad (6)$$

$$P'\text{aft} = (A \times P\text{aft}/\Sigma P) + P\text{aft} \quad (7)$$

That is, the correction amount for one combustion cycle is distributed among each fuel injection in accordance with the ratios of the target injection amounts of each fuel injection.

Figure 1:
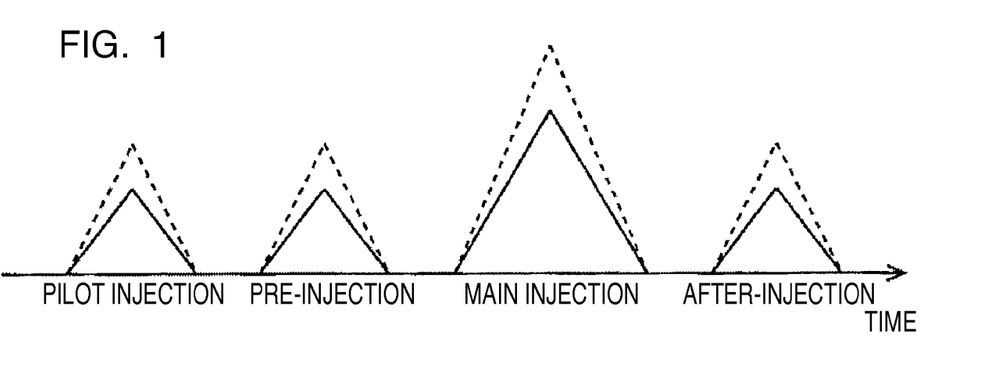
FIG. 1 is a fuel injection image diagram of a fuel injection control device in an embodiment of the present invention.

FIG. 1 illustrates an image of correction. The target injection amount in each fuel injection is herein identical to that of the example in FIG. 7. The correction amount A in one combustion cycle is also identical to that of FIG. 7. In the case of FIG. 7, the injection amount, corrected only for main injection, became extremely small. In FIG. 1, by contrast, the correction amount A in one combustion cycle is distributed among all fuel injections, as a result of which the injection amount does not become extremely small in any of pilot injection, pre-injection, main injection or after-injection. Accordingly, no combustion characteristic changes and/or misfires occur, thus affording reliable multiple injection combustion.

Further, in the present invention, a lowest reference value guard is preferably set for the injection amount of each fuel injection. Taking these lowest reference values as $\alpha$pil, $\alpha$pre, $\alpha$main, $\alpha$aft, upon deciding for instance the pilot injection amount after correction P'pil, if the pilot injection amount after correction P'pil falls below the lowest reference value $\alpha$pil, the pilot injection correction amount Apil is re-determined so that the pilot injection amount after correction P'pil becomes equal to or greater than the lowest reference value $\alpha$pil. Thus, pilot injection amount after correction P'pil=lowest reference value $\alpha$pil. This guard reduces the likelihood that the pilot injection amount after correction P'pil becomes zero or extremely small.

In the design of the injector, the lowest reference values $\alpha$pil, $\alpha$pre, $\alpha$main, $\alpha$aft are the minimum values (about 2 mm$^3$) of controllable injection amount or the minimum values that are deemed necessary for each fuel injection.

The concrete calculation flow of correction amount in each fuel injection is as follows.

Firstly, the pilot injection correction amount Apil in the first fuel injection is $$A\text{pil} = A \times P\text{pil}/(P\text{pil} + P\text{pre} + P\text{main} + P\text{aft}) \quad (8)$$

When the pilot injection correction amount Apil is used as-is, and the pilot injection amount after correction P'pil is $$P'\text{pil} = A\text{pil} + P\text{pil} < \alpha\text{pil} \quad (9)$$

the pilot injection correction amount Apil is given by $$A\text{pil} = \alpha\text{pil} - P\text{pil} \quad (10)$$

Next, the pre-injection correction amount Apre is $$A\text{pre} = (A - A\text{pil}) \times P\text{pre}/(P\text{pre} + P\text{main} + P\text{aft}) \quad (11)$$

When the pre-injection correction amount Apre is used as-is, and the pre-injection amount after correction P'pre is $$P'\text{pre} = A\text{pre} + P\text{pre} < \alpha\text{pre} \quad (12)$$

the pre-injection correction amount Apre is given by $$A\text{pre} = \alpha\text{pre} - P\text{pre} \quad (13)$$

The main injection correction amount Amain is $$A\text{main} = (A - A\text{pil} - A\text{pre}) \times P\text{main}/(P\text{main} + P\text{aft}) \quad (14)$$

When the main injection correction amount Amain is used as-is, and the injection amount after main injection correction P'main is $$P'\text{main} = A\text{main} + P\text{main} < \alpha\text{main} \quad (15)$$

the main injection correction amount Amain is given by $$A\text{main} = \alpha\text{main} - P\text{main} \quad (16)$$

Lastly, the after-injection correction amount Aaft is given unconditionally by $$A\text{aft} = A - A\text{pil} - A\text{pre} - A\text{main} \quad (17)$$

In the present embodiment, in which lowest reference value guards are set the correction amounts to be distributed sequentially from a fuel injection that is first in an execution order are determined so that when, on the basis of that determination, the injection amount (target injection amount+correction amount) of a concerned fuel injection falls below the pre-set lowest reference value $\alpha$pil, $\alpha$pre, $\alpha$main, or $\alpha$aft, the correction amount is re-determined in such a way that the injection amount becomes equal to or greater than these lowest reference values. The correction amount increment in the respective injection resulting from that re-determination is deducted from the correction amount in subsequent fuel injections. That is, the denominator and numerator for deciding the distribution rate are not simply set to $\Sigma P$, A; instead, the determined amount are omitted, one after the other, from the denominator and numerator. As a result, the re-determined correction amount increment is carried forward to subsequent fuel injections. After-injection, which is the last injection, has no carry-forward destination, and hence the correction amount is determined by unconditionally summing up the portions that have been carried over theretofore.

Moreover, in the present invention, a lowest injection amount guard is preferably set for the injection amount of each fuel injection. Taking $\beta$ as a value of lowest injection amount in all fuel injections, an instance will be explained herein in which $\beta=0$.

The concrete calculation flow of injection amount in each fuel injection is as follows.

Firstly, an after-injection amount after correction P'aft in the last fuel injection is given unconditionally herein by $$P'\text{aft} = A\text{aft} + P\text{aft} \quad (18)$$

The above calculation includes instances where P'aft<0 (for $\beta$, P'aft<$\beta$).

Next, the main injection amount after correction P'main is given by $$P'\text{main} = A\text{main} + P\text{main} \quad (19)$$

In the immediately preceding calculation, when the after-injection amount after correction P'aft is $$P'\text{aft} < 0 \text{ (for } \beta, P'\text{aft} < \beta) \quad (20)$$

the main injection amount after correction P'main is given by $$P'\text{main} = A\text{main} + P\text{main} + P'\text{aft}$$

$$\text{(for } \beta, \text{ the P'aft term becomes P'aft} - \beta) \quad (21)$$

The pre-injection amount after correction P'pre is given by $$P'\text{pre} = A\text{pre} + P\text{pre} \quad (22)$$

In the immediately preceding calculation, when the main injection amount after correction P'main is $$P'\text{main}<0 \text{ (for } \beta, P'\text{main}<\beta) \quad (23)$$

the pre-injection amount after correction P'pre is given by $$P'\text{pre}=A\text{pre}+P\text{pre}+P'\text{main}$$

(for $\beta$, the P'main term becomes P'main−$\beta$) (24)

Lastly, the pilot injection amount after correction P'pil is given by $$P'\text{pil}=A\text{pil}+P\text{pil} \quad (25)$$

In the immediately preceding calculation, when the pre-injection amount after correction P'pre is $$P'\text{pre}<0 \text{ (for } \beta, P'\text{pre}<\beta) \quad (26)$$

the pilot injection amount after correction P'pil becomes $$P'\text{pil}=A\text{pil}+P\text{pil}+P'\text{pre}$$

(for $\beta$, the P'pre term becomes P'pre−B) (27)

In such embodiment where there is set a lowest injection amount guard, therefore, an injection amount is determined by adding a correction amount to a target injection amount, sequentially from a fuel injection that is last in an execution order, so that when, on the basis of that determination, the injection amount of a concerned fuel injection falls below a pre-set lowest injection amount $\beta$ (herein, $\beta$=0), the injection amount falling below the lowest injection amount $\beta$ is deducted from the injection amount of a preceding fuel injection. Accordingly, even when a correction amount distribution is determined such that, in after-injection, which is the last fuel injection, the after-injection amount after correction, P'aft, is equal to or lower than 0 ($\beta$), i.e. the injection amount is equal to or lower than 0 ($\beta$B), thus yielding a negative fraction, the injection amount of the preceding fuel injection, i.e. main injection, can be reduced by that negative fraction. This creates a good balance in all fuel injections in multiple injection. That is, this reduces the likelihood of a reduction in the number of fuel injections during mutual correction when taking the above-described lowest reference value $\alpha$ as a controllable amount, or as a minimum value required for each injection but being an amount that enables injection even when below that minimum value, and taking the lowest injection amount $\beta$ as an injection-unfeasible amount.

A hardware configuration of the fuel injection control device of the present invention is explained next.

Figure 2:
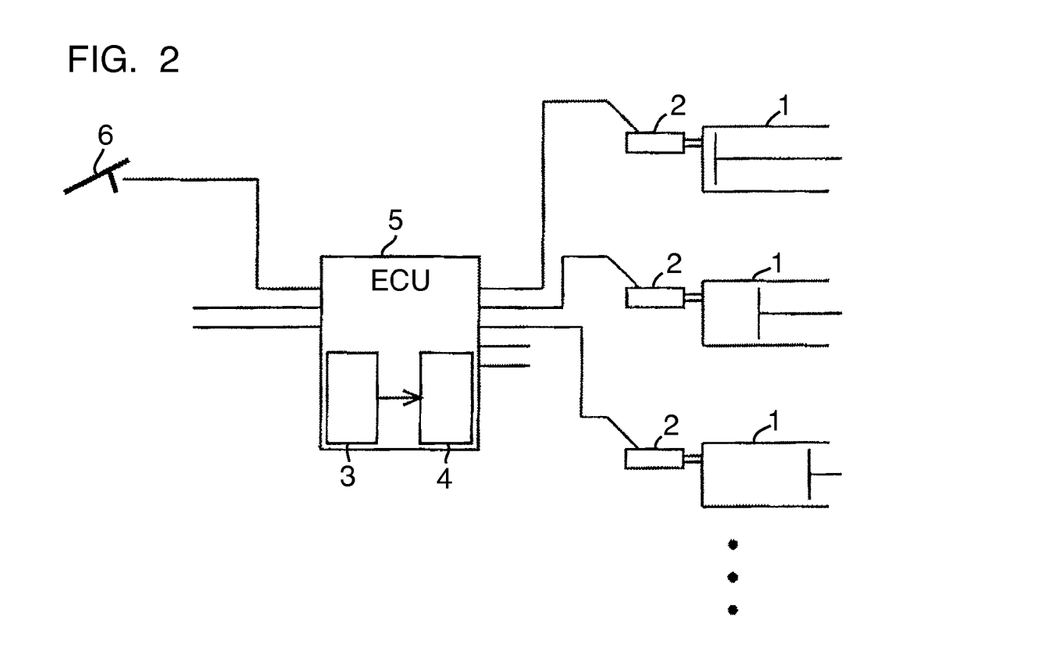
FIG. 2 is a hardware block diagram of a fuel injection control device in an embodiment of the present invention.

As illustrated in FIG. 2, the fuel injection control device according to the present invention is a fuel injection control device, comprising: a target injection amount determination means 3 for determining a target injection amount of each fuel injection for an injector 2 arranged on a respective cylinder 1 of an engine having plural cylinders 1, for injecting fuel into the cylinder 1, so that the amount of fuel to be supplied to the cylinder 1 in one combustion cycle is supplied in plural fuel injections; and a fuel injection correction amount determination means 4 for determining a correction amount of one combustion cycle for the amount of fuel to be supplied to the cylinder 1 in one combustion cycle, on the basis of one or more among inter-cylinder correction for correcting variation among the cylinders 1, output correction for correcting variation between engines, and fuel temperature correction for correcting thermal expansion due to fuel temperature; wherein the fuel injection correction amount determination means 4 distributes the correction amount among each fuel injection in accordance with the ratio of a target injection amount of each fuel injection in the cylinder 1.

A lowest reference value guard and a lowest injection amount guard are set in the fuel injection correction amount determination means 4 as already explained above.

The target injection amount determination means 3 and the fuel injection correction amount determination means 4 may be installed as software in an ECU 5. The ECU 5 is connected to various known vehicle status sensors such as an accelerator pedal stroke sensor 6, as well as incorporates a memory for storing maps, constants, and the software of the target injection amount determination means 3 and the fuel injection correction amount determination means 4, as well as a memory for storing sensor data and/or calculation results.

Figure 3:
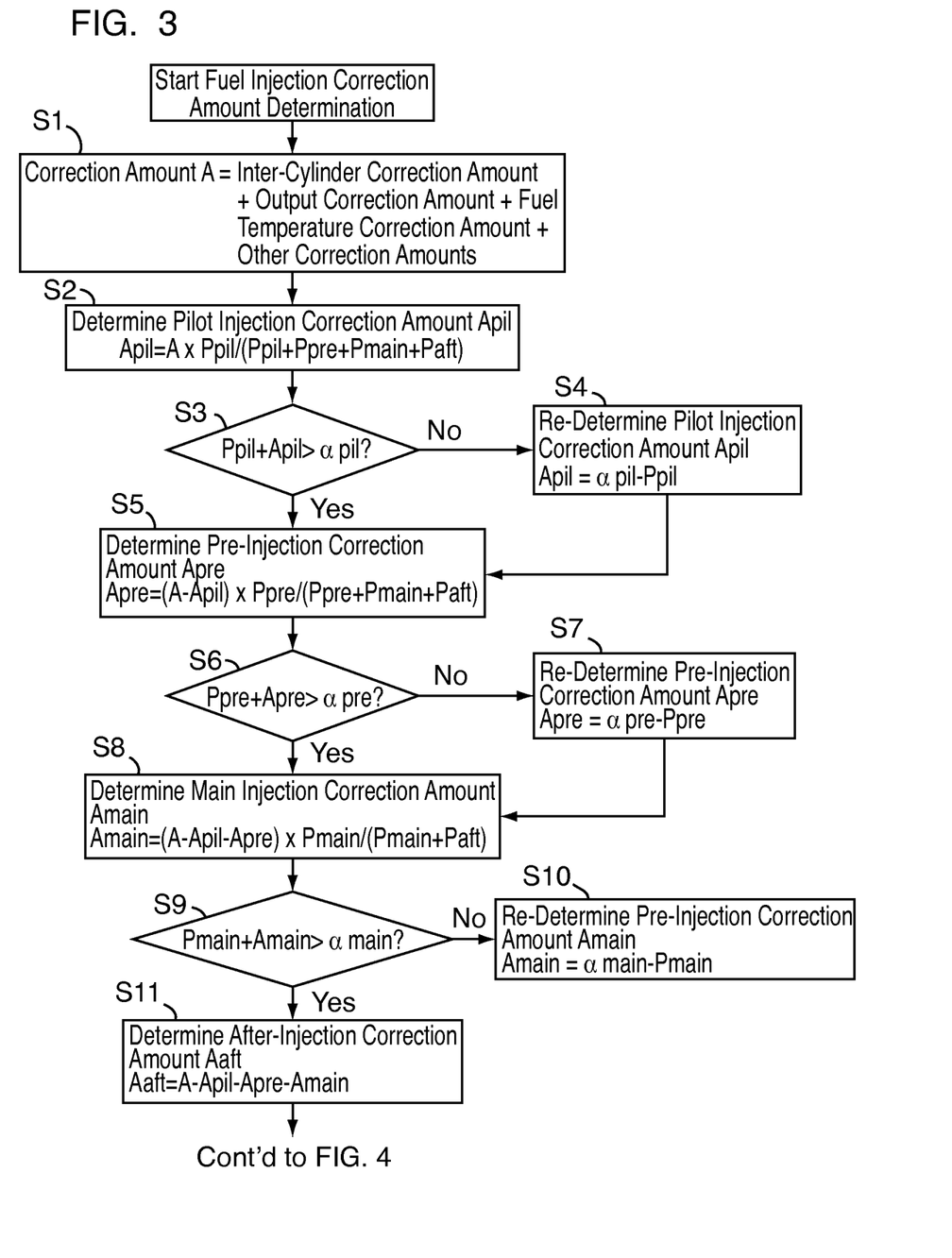
FIG. 3 is a flowchart (first half) of a process for calculating a correction amount distribution in an embodiment of the present invention.
Figure 4:
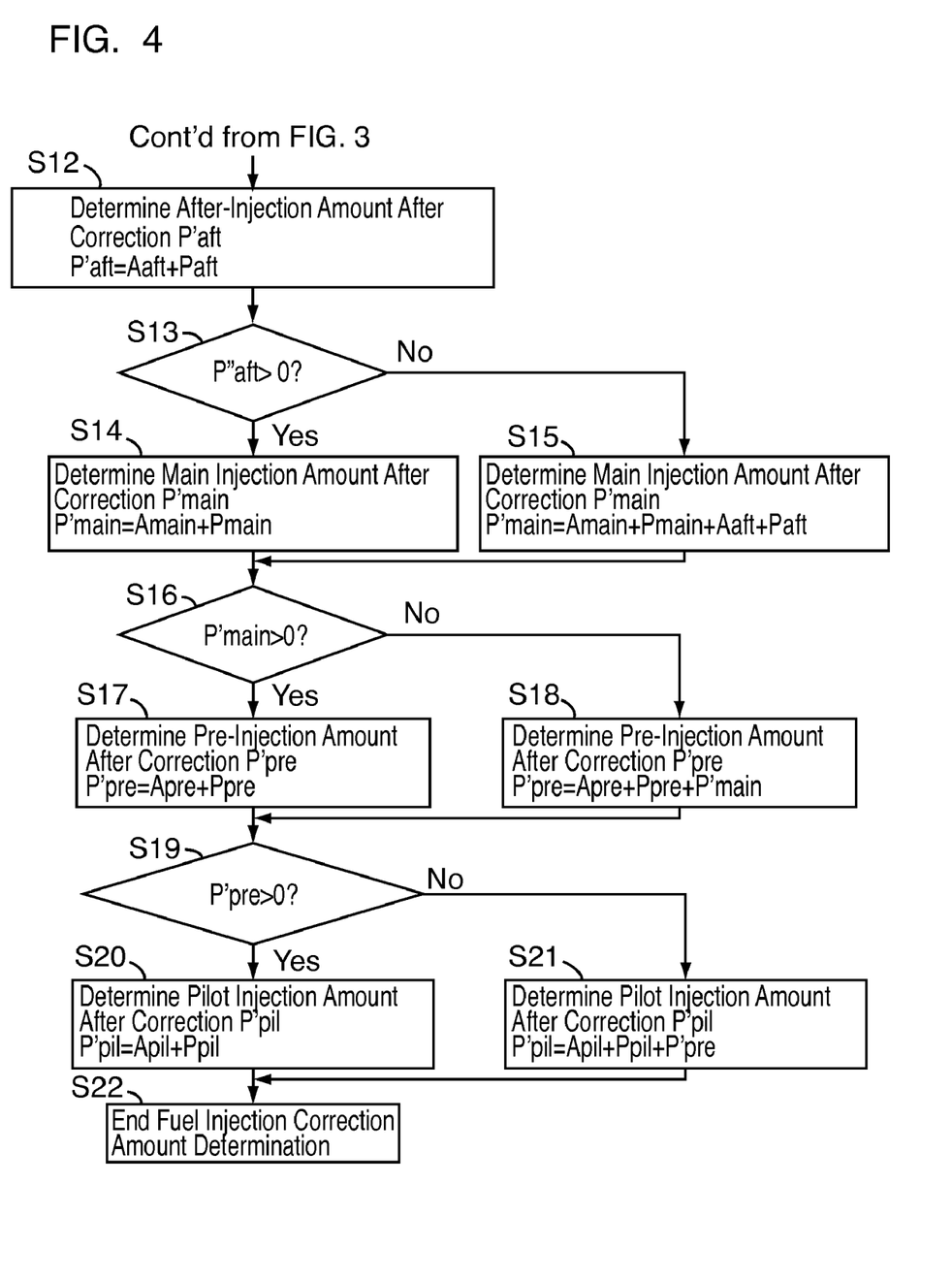
FIG. 4 is a flowchart (second half) of a process for calculating a correction amount distribution in an embodiment of the present invention.

An explanation follows next, with reference to FIGS. 3 and 4, on the process for calculating a correction amount distribution, which is the distinctive feature of the present invention, among the calculation processes that are carried out by the fuel injection correction amount determination means 4. The method for determining the correction amount A in one combustion cycle, which combines inter-cylinder correction, output correction, fuel temperature correction and other corrections, is a well-known technology using map data or the like, and hence an explanation thereof will be omitted herein.

In step S1, the correction amount A for one combustion cycle is determined. The correction amount A is an amount that denotes how much correction to be applied, to the total sum of target injection amounts across all the fuel injections that make up a multiple injection. The correction amount A may take a positive or negative value.

In step S2, the pilot injection correction amount Apil is determined. That is, the ratio of target pilot injection amount Ppil is calculated within the total sum of target injection amounts, then that ratio is multiplied by the correction amount A to calculate the correction amount, within the correction amount A, that is allotted to pilot injection (see formula (8)).

In step S3, it is judged whether or not the pilot injection amount after correction P'pil, which is the sum of the pilot injection correction amount Apil and the target pilot injection amount Ppil, is larger than a lowest reference value $\alpha$pil set beforehand (the inequality sign in the formula of the figure is the reverse of that of formula (9), but the purpose is the same).

In step S4, the pilot injection correction amount Apil is calculated using formula (10), since the judgment result in step S3 is NO. That is, it is ensured that the sum of the pilot injection correction amount Apil and the target pilot injection amount Ppil reaches at least the lowest reference value $\alpha$pil.

In step S5, the pre-injection correction amount Apre is determined. Herein, the pilot injection correction amount Apil is deducted from the correction amount A, and the target pilot injection amount Ppil is removed from the amount of fuel to be supplied in one combustion cycle. That is, the calculated correction amount, in which the pilot injection correction amount Apil is removed from the correction amount A, is the correction amount allotted to pre-injection (see formula (11)). If this calculation is arrived at via the previous step S4, the carry-over resulting from the determination of the pilot injection correction amount Apil based on formula (10) is added to the allotment.

In step S6, it is judged whether or not the pre-injection amount after correction P'pre, which is the sum of the pre-injection correction amount Apre and the target pre-injection amount Ppre, is larger than a lowest reference value $\alpha$pre set beforehand (the inequality sign in the formula of the figure is the reverse of that of formula (12), but the purpose is the same).

In step S7, the pre-injection correction amount Apre is calculated using formula (13), since the judgment result in step S6 is NO.

In step S8, the main injection correction amount Amain is determined (see formula (14)).

In step S9, it is judged whether the main injection amount after correction P'main, which is the sum of the main injection correction amount Amain and the target main injection amount Pmain, is larger than a lowest reference value αmain set beforehand (the inequality sign in the formula of the figure is the reverse of that of formula (15), but the purpose is the same).

In step S10, the main injection correction amount Amain is calculated using formula (16), since the judgment result in step S9 is NO.

In step S11, the after-injection correction amount Aaft is determined (see formula (17)).

In step S12, the after-injection amount after correction P'aft is determined. The after-injection amount after correction P'aft determined here is the control amount that is actually given to the injector during after-injection (see formula (18)).

In step S13, it is judged whether or not the after-injection amount after correction P'aft determined in step S12 is larger than 0 (the inequality sign in the formula of the figure is the reverse of that of formula (20), but the purpose is the same). Herein it is judged whether or not a calculated injection amount for after-injection is equal to or lower than the lowest injection amount β (negative) through the sequential carry-overs during determination of the correction amounts in the process from the step S1 to the step S11.

In step S14, the main injection amount after correction P'main is determined using formula (19), since the judgment result in step S13 is YES.

In step S15, the main injection amount after correction P'main is determined using formula (21), since the judgment result in step S13 is NO. That is, the difference by which the after-injection amount is not more than the lowest injection amount β is removed from the main injection.

In step S16, it is judged whether or not the main injection amount after correction P'main determined in steps S14 and S15 is larger than (β) 0 (the inequality sign in the formula of the figure is the reverse of that of formula (23), but the purpose is the same).

In step S17, the pre-injection amount after correction P'pre is determined using formula (22), since the judgment result in step S16 is YES.

In step S18, the pre-injection amount after correction P'pre is determined using formula (24), since the judgment result in step S16 is NO.

In step S19, it is judged whether or not the pre-injection amount after correction P'predetermined in steps S17 and S18 is larger than 0 (β) (the inequality sign in the formula of the figure is the reverse of that of formula (26), but the purpose is the same).

In step S20, the pilot injection amount after correction P'pil is determined using formula (25), since the judgment result in step S19 is YES.

In step S21, the pilot injection amount after correction P'pil is determined using formula (27), since the judgment result in step S19 is NO.

The process from step S12 to step S21 is equivalent to recovering the injection amount differences by which each injection amount is not more than the lowest injection amount β when using the correction amounts determined in steps S1 to S11, by retracing the inverse route.

According to the above-described embodiment of the present invention, since the correction amount for each fuel injection is distributed in accordance with the ratio of a target injection amount of each fuel injection, it is possible to prevent only a specific fuel injection from being greatly influenced by correction.

Also, setting a lowest reference value guard or a lowest injection amount guard allows avoiding a situation in which the determined correction amount or injection amount from being negative, zero, a value equal to or lower than a lowest injection capacity, or a value equal to or lower than a lowest required value, which in turn allows preventing the missing of a required fuel injection. That is, a possibility of a change in the number of injections is reduced. Also, the calculation method in which the calculations of the correction amount or injection amount in the guards are carried over following a timing sequence thus reliably allows injecting fuel in a fuel injection that precedes a main injection. Also, comprehensive correction including inter-cylinder correction, output correction and fuel temperature correction can be carried out while maintaining multiple injection (i.e., while actually carrying out plurality of fuel injections).

In the above embodiment, there were carried out 4 fuel injections called pilot injection, pre-injection, main injection and after-injection, but the present invention can be realized also when fuel is injected over any two or more separate fuel injections. Moreover, the lowest injection amount β was set to 0, i.e. to an injection-unfeasible amount, but it needs only to be smaller than a limiting amount based on a lowest reference value α. Also, individual values β may be set up for the respective injections.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fuel injection control device, comprising: target injection amount determination means for determining a target injection amount of each fuel injection of each cylinder for an injector arranged on a respective cylinder of an engine having a plurality of cylinders, for injecting fuel into the cylinder, so that the amount of fuel to be supplied to the cylinder in one combustion cycle is supplied in a plurality of fuel injections; and fuel injection correction amount determination means for determining a fuel correction amount of one combustion cycle for the amount of fuel to be supplied to the cylinder in one combustion cycle, wherein said fuel injection correction amount determination means distributes the correction amount among each fuel injection in accordance with the ratio of a target injection amount of each fuel injection in the cylinder.

2. The fuel injection control device according to claim 1, wherein said fuel injection correction amount determination means determines a correction amount that is distributed sequentially from a fuel injection, among a plurality of fuel injections, that is first in an execution order, so that when, on the basis of the determination, an injection amount (target injection amount+correction amount) of the fuel injection falls below a pre-set lowest reference value for each injection, the correction amount is re-determined such that the injection amount becomes equal to or greater than the lowest reference value, and the correction amount increment in the fuel injection, resulting from that re-determination, is deducted from a correction amount in subsequent fuel injections.

3. The fuel injection control device according to claim 2, wherein said fuel injection correction amount determination means determines an injection amount by adding a correction amount to a target injection amount, sequentially from a fuel injection, among a plurality of fuel injections, that is last in an execution order, so that when, on the basis of the determination, the injection amount of the fuel injection falls below a pre-set lowest injection amount, the injection amount is re-determined such that the injection amount becomes equal to or greater than the lowest injection amount, and the injection amount increment in the fuel injection, resulting from that re-determination, is deducted from the injection amount of a preceding fuel injection.

* * * * *